United States Patent [19]
Miron et al.

[11] Patent Number: 6,034,992
[45] Date of Patent: Mar. 7, 2000

[54] HIGH-SPEED PC MODEM CONNECTION SYSTEM

[75] Inventors: Avi Miron, Zur Yigal; Yigal Jacoby, Raanana; Shlomo Gutman, Rishon Lezion, all of Israel

[73] Assignee: Globaloop Ltd., Kfar Saba, Israel

[21] Appl. No.: 09/063,297

[22] Filed: Apr. 21, 1998

[51] Int. Cl.$^7$ ............................. H04B 1/38; G06F 13/00
[52] U.S. Cl. ................. 375/222; 395/200.48; 395/821
[58] Field of Search ......................... 375/222; 379/900, 379/93.08; 395/200.48, 821; 455/557; 463/41

[56] References Cited

U.S. PATENT DOCUMENTS 5,905,781  5/1999  McHale et al. .................. 379/93.14

OTHER PUBLICATIONS

Chang et al, Architecture Alternative for Wireless Data Services: Interworking with Voiceband Modem, IEE, 1994.
Lawton, George, "Paving the Information Superhighway's Last Mile", Computer, 1998.
ACC Products, http://www.acc.com, brochures re: Tigris.
ACC Products, http://www.acc.com, brochures re: Tigris 3–Slot.
Ariel Corp., 2540 Rte. 130, Cranbury, N.J. 08512, "Integrating Data Communications With Existing CT Systems", no pub. Data given.
Sattel Communications, 26025 Mureau Rd., Calabasas, CA 91302, "Capitalizing On Local Exchange Opportunities", no pub. Data given.
http://www.epl.co.uk, EPL Ltd., "How Does 56kbps Technology Work".
Lucent Technologies, http://www.lucent.com, "What is V.90?".
Lucent Technologies, http://www.lucent.com, "K56flex™ Modem Technology?".
Lucent Technologies, http://www.lucent.com, "V.90 FAQS".
Lucent Technologies, http://www.lucent.com, "FAQS".
http://www.itu.int/newsroom, "Agreement Reached On 56k Modem Standard".
Vance, L., "56K Modems? Not so Fast!", http://www.pp-n.org/net 97/mar/mar1.html.
Morgan, C., "The 56K Modem Myth—Don'y Let Misinformation About 56K Technology Trip You Up", http://www.techweb.com/se/techsear, Window Internet Magazine, Jul. 1, 1997, Issue 807, Sec. Windows on the Web.
Sattel Communications, 26025 Mureau Rd., Calabasas, CA 91302, "The Internet Service Provider's Challenge" no pub. Data given.

*Primary Examiner*—Stephen Chin
*Assistant Examiner*—Albert Park
*Attorney, Agent, or Firm*—Mark M. Friedman

[57] ABSTRACT

The present invention relates to a system for directly connecting two PC modems over dry copper, for the purpose of accessing an outside provider of computational services, substantially as though the connection were provided by the telephone network services. In preferred embodiments, both modems follow the V.90 specification, and are connected through an analog front end which emulates some components of the digital telephone network services. In another preferred embodiment, the present invention enables a group of private users in a contained community of one or more adjacent buildings, each with a PC modem, to share a higher speed digital line, such as an ISDN for example, for the purpose of providing a more economical access to a computational service.

21 Claims, 3 Drawing Sheets

HIGH-SPEED PC MODEM CONNECTION SYSTEM

FIELD AND BACKGROUND OF THE INVENTION

The present invention is related to a high-speed system for connecting two PC modems directly over telephone wires, without the use of the telephone network, and more particularly, the ability to provide plurality of such connections to an outside provider of computational services, through a shared central line.

Currently, certain types of PC modems can be directly connected to each other via a telephone wire, but without the provision of telephone network services. These modems implement a direct connection over "dry copper". Such direct connections are possible with modems which follow the V.34 specification. However, such modems are limited to a maximum speed of 33.6 Kb/second "full duplex", or in both directions simultaneously. Currently available modems can reach a maximum speed of 56 Kb/second on the downstream direction (i.e. from the server to the user), but follow the new and developing V.90 specification, that is being set by the ITU (International Telecommunication Union). These new modems achieve the increased speed by leveraging on the digitally upgraded telephony network. These modems cannot be directly connected to each other at the full 56 Kb/second speed, without the intervention of some of the services provided by the regular digital telephony network. In the absence of the digital telephony network, directly connected modems following the V.90 specification can only achieve the maximum rate of 33.6 Kb/second. Thus, these modems are not able to take full advantage of the available capacity when directly connected.

Such direct connections can be particularly useful to avoid the purchase of telephone network services when connecting to the Internet. The worldwide network of computers known as the "Internet", has recently seen explosive growth, as many more computer users have chosen to become connected to this network. Most private computer users connect to the Internet from their homes through a PC (Personal Computer) which is equipped with a PC modem. The modem is typically connected to the existing telephone network, which is in turn connected to the modem of the Internet Service Provider (ISP). The user must pay for the services of the telephone network to connect to the Internet.

A significant cost reduction could be realized if the PC modem of the private user could be connected to the ISP over "dry copper" and without the purchase of telephone network services. Unfortunately, if modems following the V.90 specification are used, such a direct connection is not possible without sacrificing speed.

There is therefore a need for, and it would be useful to have, a system for connecting two modems, without the services of the telephony network, particularly for the purpose of providing a connection to the Internet, while maintaining the full speed of the modems, such that even two modems following the V.90 specification can be directly connected over "dry copper" while maintaining a substantially maximum speed of communication.

SUMMARY OF THE INVENTION

According to the present invention, there is provided a system for a direct modem to modem connection to an Internet Service Provider (ISP), the system comprising: (a) a first PC modem; (b) a second modem, the second modem being connected to the ISP; (c) a dry copper connection directly connecting the first PC modem and the second modem, such that the first PC modem is able to connect to the ISP.

Preferably, the first PC modem and the second modem follow the V.34 specification. More preferably, the first PC modem further includes a plurality of first PC modems, the second PC modem further includes a plurality of second PC modems, each of the first and the second PC modems having a corresponding dry copper connection, the system further comprising: (d) a central line for providing a shared connection between each of the plurality of second PC modems and the ISP. Most preferably, the central line is a high speed digital connection. Preferably, the central line is selected from the group consisting of T1/E1, FT1/FE1, ISDN, xDSL and FRNx56/64. Preferably, the dry copper connections are telephone wires, such that each of the plurality of first PC modems is connected to one of the telephone wires through a telephone wire socket.

According to another preferred embodiment of the present invention, the system further comprises: (d) an Analog Front End (AFE), the AFE being connected between the second PC modem and the dry copper connection, the AFE providing a digital to analog conversion, such that the first PC modem and the second PC modem are able to communicate at a substantially maximum rate. Preferably, the first PC modem and the second PC modem follow the V.90 specification and the second modem is a server side modem. More preferably, the digital to analog conversion enables the first PC modem and the second PC modem to communicate over the dry copper connection such that communication is substantially similar to communication over a regular digital telephony network. Also more preferably, the AFE features: (i) a CODEC (enCOder/DECoder) for analog to digital and digital to analog conversion. Most preferably, the AFE further features: (ii) a frame creator for providing frame synchronization and clock synchronization.

According to still other preferred embodiments of the present invention, the first PC modem includes a plurality of first PC modems, the second PC modem further includes a plurality of second PC modems, the AFE further includes a plurality of Analog Front Ends (AFE's), each of the plurality of AFE's being connected to one of the plurality of second PC modems, and the dry copper connection further includes a plurality of dry copper connections, each of the plurality of dry copper connections being connected to one of the plurality of first PC modems and to one of the plurality of AFE's, such that each of the plurality of first PC modems is able to communicate with one of the plurality of second PC modems at a substantially maximum rate, the system further comprising: (e) a central line for providing a shared connection between each of the plurality of second PC modems and the ISP.

According to another embodiment of the present invention, there is provided a system for a direct modem to modem connection to the Internet, the system comprising: (a) a first PC modem, the first PC modem following the V.34 specification; (b) an Internet Service Provider (ISP) for providing a connection to the Internet; (c) a second modem, the second modem being present at the ISP and the second modem following the V.34 protocol; (d) a dry copper connection directly connecting the first PC modem and the second modem, such that the first PC modem is able to directly connect to the ISP and to access the Internet, thereby obviating the need for a telephone network service.

According to yet another embodiment of the present invention, there is provided a system for connecting a plurality of users to an ISP (Internet Service Provider), comprising: (a) a plurality of user PC modems, each of the plurality of user PC modems corresponding to one of the plurality of users, and each of the plurality of user PC modems following the V.34 specification; (b) a plurality of second PC modems, each of the plurality of second PC modems being present at the ISP and each of the plurality of second PC modems following the V.34 specification; (c) a plurality of dry copper connections, each of the plurality of dry copper connections being directly connected to one of the plurality of user PC modems and to one of the plurality of second PC modems; and (d) a central line for providing a shared connection between each of the plurality of second PC modems and the ISP.

Preferably, the central line is a high speed digital connection. More preferably, the central line is selected from the group consisting of T1/E1, FT1/FE1, ISDN, xDSL and FRNx56/64.

According to a preferred embodiment of the present invention, the plurality of users are located in a contained community. Preferably, the contained community includes at least one building. More preferably, the dry copper connections are telephone wires terminated within the at least one building, such that each of the plurality of user PC modems is connected to one of the telephone wires through a telephone wire socket.

According to still another embodiment of the present invention, there is provided a system for providing a direct modem to modem connection, the system comprising: (a) a first PC modem; (b) a server side modem; (c) a dry copper connection for directly connecting the first PC modem and the server side modem; and (d) an Analog Front End (AFE), the AFE being connected between the server side modem and the dry copper connection, the AFE providing a digital to analog conversion, such that the first PC modem and the server side modem are able to communicate at a substantially maximum rate.

Preferably, the first PC modem and the server side modem follow the V.90 specification. More preferably, the digital to analog conversion enables the first modem and the server side modem to communicate as though the dry copper connection was a regular digital telephony network. Also more preferably, the AFE features: (i) a CODEC (enCOder/DECoder) for analog to digital and digital to analog conversion. Most preferably, the AFE further features: (ii) a frame creator for providing frame synchronization and clock synchronization.

According to another embodiment of the present invention, there is provided a digital system for connecting a plurality of users to an ISP, comprising: (a) a plurality of user PC modems, each of the plurality of user PC modems corresponding to one of the plurality of users; (b) a plurality of server side modems; (c) a plurality of Analog Front Ends (AFE's), each of the plurality of AFE's being connected to one of the plurality of server side modems, each of the plurality of AFE's providing a digital to analog conversion; (d) a plurality of dry copper connections, each of the plurality of dry copper connections being connected to one of the plurality of user PC modems and to one of the plurality of AFE's, such that each of the plurality of user PC modems is able to communicate with one of the plurality of server side modems at a substantially maximum rate; and (e) a central line for providing a shared connection between each of the plurality of server side modems and the ISP.

Preferably, the central line is a high speed digital connection. More preferably, the central line is selected from the group consisting of T1/E1, FT1/FE1, ISDN, xDSL and FRNx56/64. Most preferably, the user PC modems and the server side modems follow the V.90 specification.

According to a preferred embodiment of the present invention, the plurality of users are located in a contained community. Preferably, the contained community includes at least one building. More preferably, the dry copper connections are telephone wires terminated within the at least one building, such that each of the plurality of user PC modems is connected to one of the telephone wires through a telephone wire socket.

According to still another embodiment of the present invention, there is provided an enhanced server modem for direct connection to a user PC modem through a dry copper connection, the user PC modem following the V.90 specification, the enhanced server modem comprising: (a) a server side modem following the V.90 specification; and (b) an Analog Front End (AFE) for providing a digital to analog conversion, the AFE including: (i) a CODEC (enCOder/DECoder) for analog to digital and digital to analog conversion; and (ii) a frame creator for providing frame synchronization and clock synchronization, such that the frame creator and the CODEC are able to provide the digital to analog conversion; the server side modem being connected to the dry copper connection through the AFE, such that the server side modem is able to communicate at a substantially maximum rate with the user PC modem.

Hereinafter, the term "network" refers to a connection between any two computers which permits the transmission of data. Hereinafter, the term "computer" includes, but is not limited to, personal computers (PC) having an operating system such as DOS, Windows™, OS/2™ or Linux; Mackintosh™ computers; computers having JAVA™-OS as the operating system; computer terminals connected to a network; and graphical workstations such as the computers of Sun Microsystems ™ and Silicon Graphics™, and other computers having some version of the UNIX operating system such as AIX or SOLARIS™ of Sun Microsystems™; or any other known and available operating system. Hereinafter, the term "Windows™" includes but is not limited to Windows95™, Windows 3.X™ in which "x" is an integer such as "1", Windows NT™, Windows98™, Windows CE™ and any upgraded versions of these operating systems by Microsoft Inc. (Seattle, Wash., USA).

Hereinafter, the term "private user" refers to the user of a computer, either a private individual, a family, a business or an employee of a business. Hereinafter, the term "V.90 specification" refers to the specification for a 56 Kb/second modem and includes all proprietary variants thereof, including but not limited to 56KFlex™ and X2™.

The term "ISP" as used herein includes both an Internet Service Provider and any other provider of electronic services accessible through the modem of a computer, such as an electronic bulletin board, for example.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF PREFERRED EMBODIMENTS

Figure 1A:
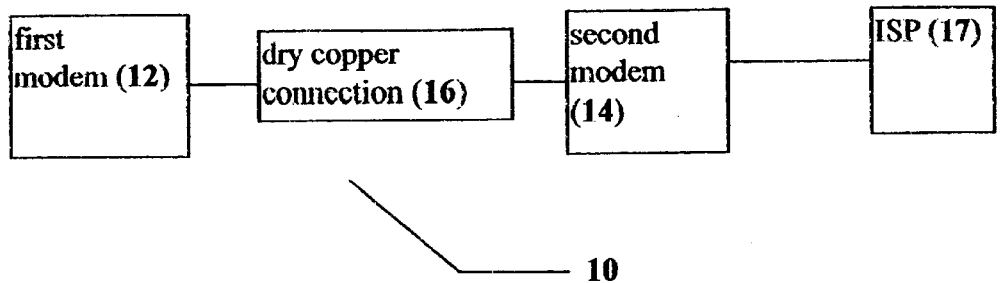
FIGS. 1A and 1B show exemplary systems for connecting two modems according to the present invention.

The present invention relates to a device and a system for providing a direct connection between two modems, in which both modems are 56 Kb/second modems following the V.90 specification. Alternatively, one or both modems may follow the V.34 specification, but one modem is at an ISP, so that Internet services and other electronic services are provided directly through the modem-to-modem connection. The modem-to-modem connection contemplated in the present invention is through "dry copper", without purchasing or otherwise using the services of the telephone network. Such a dry copper connection could be any suitable connection, such as one long pair of telephone wires or a better grade of copper wire, or wireless channels operating with radiowaves, satellite or infrared, for example. The exact nature of the connection is less important than the fact that the connection is made without purchasing or otherwise using the services of the telephone network at the time when communication occurs.

The "dry copper" connection is made through the enhanced server modem equipped with an AFE (Analog Front End) of the present invention, which provides a bridge between the dry copper connection and the second modem, such that the both modems are able to connect in a substantially transparent fashion, as though the modems were connected to each other through the existing regular digital telephony network.

In a preferred embodiment of the present invention, a connection is provided to an ISP through a central line, which may be a high speed digital line such as an ISDN (Integrated Service Digital Network) line for example, for a plurality of private users. The connection for each user is made through "dry copper", for example by using the existing telephony wires, but without purchasing telephone network services. In this case, the modem of the private user would be connected to a gateway modem for the digital line through dry copper, although the connection between the digital line and the ISP could be provided through the data services of the telephone company.

The private users sharing the digital line are preferably situated at the same location as the connection to the digital line, which may be an office or apartment building, for example. Alternatively, the private users may be distributed in a group of buildings, for example a cluster of homes in a single housing development, as long as a suitable telephone wire connection to the digital line is available. For the purpose of clarity only, the following description will center upon a group of private users in a building only, it being understood that this is an example only and is not meant to be limiting. Each private user is able to connect to the digital line through an existing PC modem and the existing telephone wiring, again with the addition of the enhanced server modem of the present invention.

The principles and operation of a device and a system for the connection of two modems to each other through a "dry copper" connection according to the present invention may be better understood with reference to the drawings and the accompanying description, it being understood that these drawings are given for illustrative purposes only and are not meant to be limiting.

Referring now to the drawings, FIG. 1A shows a system for directly connecting two V.34 specification modems over a "dry copper" connection, in which the connection enables Internet services to be provided. A system 10 features a first modem 12 and a second modem 14. Both first modem 12 and a second modem 14 are PC modems. First modem 12 is connected to second modem 14 through a "dry copper" connection 16. "Dry copper" connection 16 is substantially any connection which can provide the necessary connection without the services of the telephone company during the actual communication between first modem 12 and second modem 14. Examples of such a channel include, but are not limited to, channels operating through radiowaves, satellite, infrared or other types of wireless communication, or even a telephone wire itself, as long as the services of the telephone network are not used during the actual communication. The term "dry copper" is used because the telephone line is used simply as a long, inactive copper wire, without any additional services. Clearly, the use of "dry copper" could result in substantial savings, since the services of the telephone network would not need to be purchased.

Second modem 14 is connected an ISP (Internet Service Provider) 17, such that first modem 12 is able to connect to ISP 17, and hence to access the Internet, through second modem 14. Second modem 14 is preferably present at ISP 17. ISP 17 acts as a gateway to the Internet. Thus, system 10 enables Internet services to be provided over dry copper connection 16, substantially as though first modem 12 and second modem 14 were connected through the regular telephony network.

Figure 1B:
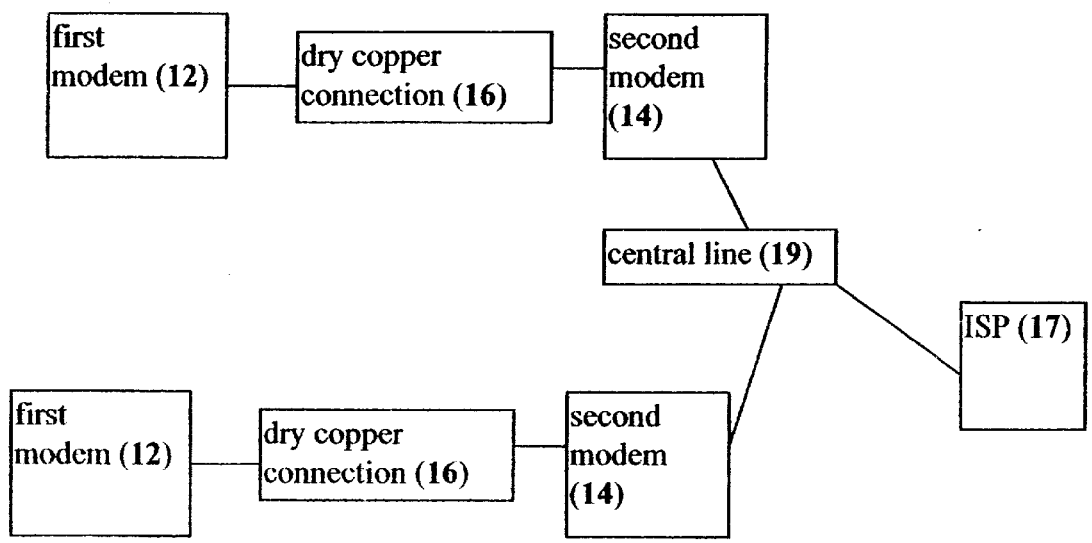

FIG. 1B shows another embodiment of system 10 for connecting a plurality of V.34 specification modems to an ISP over a shared central line. In this embodiment, a plurality of second PC modems 14 is connected to ISP 17 through a central line 19. Central line 19 is preferably a high speed digital line, and is more preferably selected from the group consisting of T1/E1, ISDN, xDSL and FRNe56/54, although of course any other type of digital connection could be used. A plurality of users could share central line 19 to ISP 17 by connecting each of a plurality of first modems 12, or "user modems", to one of the plurality of second modems 14 through each of a plurality of dry copper connections 16. Both first modems 12 and second modems 14 must follow the V.34 specification.

Unfortunately, as noted previously, the direct modem to modem connection of FIGS. 1A and 1B can be made at a substantially maximum rate only for modems which follow the V.34 specification, and which have a maximum speed of 33.6 Kb/second. Hereinafter, the term "substantially maximum rate" for communication between two modems following the V.90 specification refers to a speed of transmission which is greater than about 33.6 Kb/second.

Figure 2:
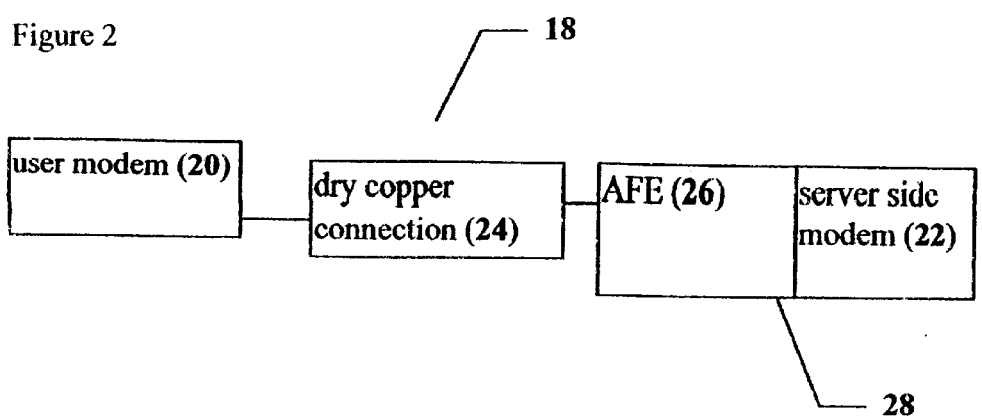
FIG. 2 illustrates another system for connecting two modems according to the present invention.

The present invention also provides a solution when both modems are operating according to the V.90 specification. FIG. 2 shows a direct connection system according to the present invention for directly connecting two modems at top speed, even if both modems follow the V.90 specification. A direct connection system 18 features a user modem 20 and a server side modem 22. User modem 20 is connected to server side modem 22 over a "dry copper" connection 24, substantially as described for FIGS. 1A and 1B. Both user modem 20 and server side modem 22 follow the V.90 specification. Examples of such modem technology includes, but is not limited to, the Lucent Technology™ K56flex™ modem and the 3COM™ X2™ modem. The V.90 specification describes an asymmetrical connection between two modems which follow the specification, so that user modem 20 is not interchangeable with server side modem 22 and vice versa.

The asymmetric functionality of server side modem 22 and user modem 20 does not permit server side modem 22 to be directly connected to user modem 20 over dry copper connection 24 at a substantially maximum rate. An additional analog front end 26 must also be connected between dry copper connection 24 and to server side modem 22. Analog front end 26 is able to provide a digital to analog conversion, and preferably is also able to provide frame and clock synchronization. The term "digital to analog conversion" includes conversions between digital and analog in both directions, such that analog front end 26 emulates some of the services of the digital telephone network, thereby enabling user modem 20 to communicate with server side modem 22 at a substantially maximum rate, even over dry copper connection 24. The combination of analog front end 26 and server side modem 22 is referred to herein as an enhanced server modem 28.

As far as the private user is concerned, the connection to server side modem 22 in combination with analog front end 26 over dry copper connection 24 is substantially identical to the currently available systems, in which the connection is made through the regular telephony network. In both cases, user modem 20 goes off-hook, optionally detects the presence of the dial tone on dry copper connection 24 and dials a telephone number. Once ringing has been detected, user modem 20 waits for server side modem 22 at the other end to respond, and establishes communication with server side modem 22.

Although user modem 20 optionally detects the presence of a dial tone, the dial tone is provided more for convenience than necessity. Furthermore, actual dialing by user modem 20, as well as waiting to detect a ring before connecting to server side modem 22, are only include in the operation of direct connection system 18 as well as in the operation of system 10 for convenience, since such functions more closely emulate the regular operation of user modem 20, thereby obviating the need for any adjustments to user modem 20. Thus, to the computer user, user modem 20 appears to operate as before, while permitting a cost savings to be realized by removing the need for the services of the telephone network to provide the connection between user modem 20 and server side modem 22.

Figure 3:
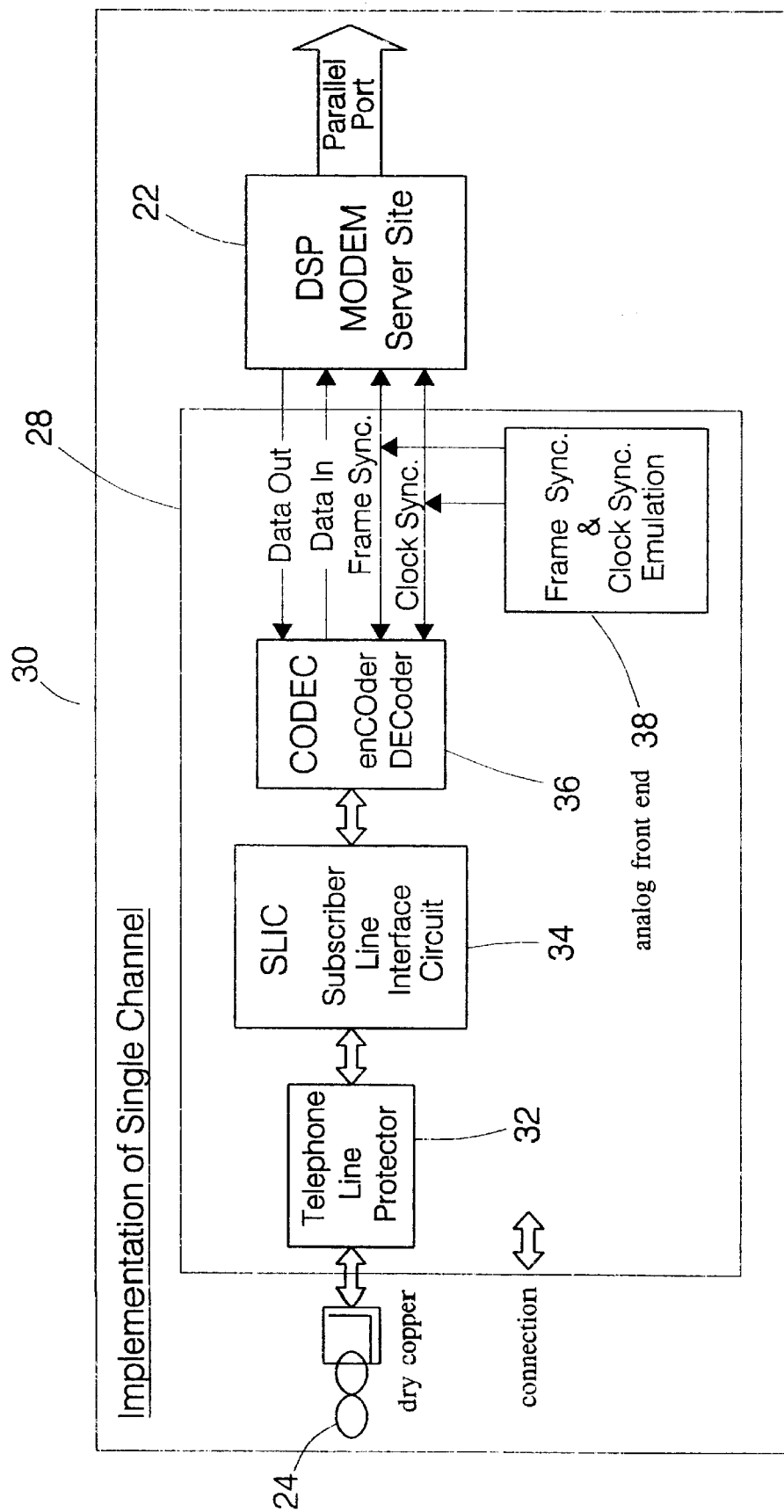
FIG. 3 illustrates one example of the enhanced server modem of the present invention.

FIG. 3 illustrates one example of the enhanced server modem of the present invention. Enhanced server modem 28 features analog front end 28 for connection to dry copper connection 24, which is shown herein as true dry copper from an extant telephone wire. As noted previously, analog front end 28 emulates some of the features of the digital telephony network, thereby providing digital to analog conversion for server side modem 22.

Analog front end 28 is preferably connected to dry copper connection 24 through a protector chip 32, which protects analog front end 28 from high voltage and/or high current, as necessary for this illustrated embodiment. The particular implementation of protector chip 32 follows the requirements and standards set by the telephone companies and could easily be determined by one of ordinary skill in the art. Within analog front end 28, the signal then passes to a SLIC (Subscriber Line Interface Circuit) 34 connected to a CODEC (enCOder/DECoder) 36. CODEC 36 implements the analog to digital, and digital to analog, conversion between user modem 20 and server side modem 22. CODEC 36 uses digital signaling for 8 Kb samples over the band limited analog channel. The output of CODEC 36 is PCM (Pulse code modulation).

CODEC 36 is then connected to a frame creator 38. Frame creator 38 provides both frame synchronization and clock synchronization, both of which are services usually provided by the telephone component of the front end of the digital telephony network. Frame creator 38 then sends the signal to server side modem 22 and to CODEC 36 for communication from user modem 20 to server side modem 22. Frame creator 38 provides synchronization for receiving and transmitting data from server side modem 22. Thus, analog front end 28 is able to emulate those necessary services of the digital telephony network so that user modem 20 and server side modem 22 are able to communicate directly over "dry copper", while maintaining a rate at, or substantially near to, the full 56 Kb/second performance rate on the downstream direction as described in the V.90 specification.

In a preferred embodiment of the present invention, enhanced server modem 28 is part of a system for enabling the PC modem of a plurality of private users to be connected to a shared connection, such as a high speed digital line. Advantages of such a system include cost savings to the private user through elimination of the individual telephone service charges while sharing a connection, the ability of the private user to obtain all services associated with an Internet or other electronic service connection from a single provider such as an ISP, and the maintenance of a substantially maximum rate of performance when two modems following the V.90 specification are connected through the system of the present invention.

Figure 4:
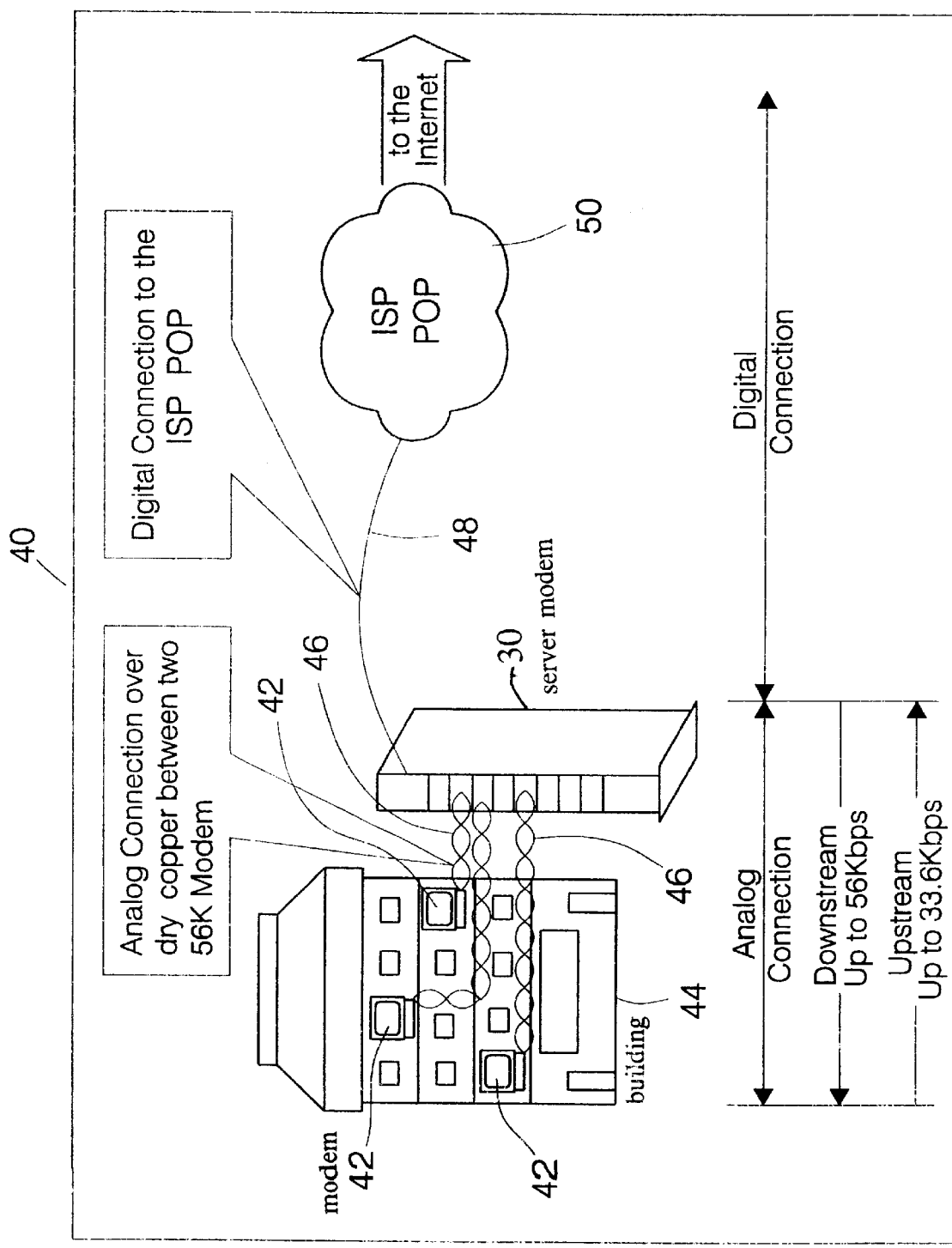
FIG. 4 illustrates an exemplary system for connecting private users within a building to a shared central line according to the present invention.

FIG. 4 illustrates an exemplary system for connecting at least one, and preferably a plurality of, private users to a digital line according to the present invention. A digital system 40 features a PC modem 42 connected to the computer of a private user (not shown), of which a plurality are shown. PC modem 42 could follow the V.90 specification, for example.

In the preferred embodiment illustrated, a plurality of private users are present in a contained community, shown as a building 44, each of whom are connected through an individual PC modem 42. Each PC modem 42 is connected to a dry copper connection, shown herein as the preferred embodiment of a telephone wire 46 terminated within building 44, of which a plurality is shown. Telephone wire 46 is a regular single twisted-pair telephone copper wire. For most buildings 44 the already extant telephone wiring is the most convenient type of dry copper connection.

At the other end, each telephone wire 46 is connected to enhanced server modem 28. Enhanced server modem 28 is also connected to a central line 48. Central line 48 is preferably a high speed digital line, and is more preferably selected from the group consisting of T1/E1, ISDN, xDSL and FRNe56/54, although of course any other type of digital connection could be used. In the preferred embodiment shown, central line 48 is connected from enhanced server modem 28 at one side, and to a POP (Point of Presence) 50 of an ISP at the other side. POP 50 is simply intended to represent access to one type of service which could be provided through central line 48. Other types of services include, but are not limited to, a database or a bulletin board service.

It will be appreciated that the above descriptions are intended only to serve as examples, and that many other embodiments are possible within the spirit and the scope of the present invention.

What is claimed:

1. A system for a direct modem to modem connection to an Internet Service Provider (ISP), the system comprising:

(a) a first PC modem;

(b) a second PC modem, said second PC modem being connected to the ISP, wherein said first PC modem and said second PC modem follow the V.90 specification, and said send PC modem is a server side modem:

(c) a dry copper connection directly connecting said first PC modem and said second PC modem, such that said first PC modem is able to connect to the ISP; and (d) an Analog Front End (AFE), said AFE being connected between said second PC modem and said dry copper connection, said AFE providing a digital to analog conversion, such that said first PC modem and said second PC modem are able to communicate at a substantially maximum rate.

2. The system of claim 1, wherein said digital to analog conversion enables said first PC modem and said second PC modem to communicate over said dry copper connection such that communication is substantially similar to communication over a regular digital telephony network.

3. The system of claim 1, wherein said AFE features:

(i) a CODEC (enCOder/DECoder) for analog to digital and digital to analog conversion.

4. The system of claim 3, wherein said AFE further features:

(ii) a frame creator for providing frame synchronization and clock synchronization.

5. The system of claim 1, wherein said first PC modem includes a plurality of first PC modems, said second PC modem further includes a plurality of second PC modems, said AFE further includes a plurality of Analog Front Ends (AFE's), each of said plurality of AFE's being connected to one of said plurality of second PC modems, and said dry copper connection further includes a plurality of dry copper connections, each of said plurality of dry copper connections being connected to one of said plurality of first PC modems and to one of said plurality of AFE's, such that each of said plurality of first PC modems is able to communicate with one of said plurality of second PC modems at a substantially maximum rate, the system further comprising:

(e) a central line for providing a shared connection between each of said plurality of second PC modems and the ISP.

6. The system of claim 5, wherein said central line is a high speed digital connection.

7. The system of claim 6, wherein said central line is selected from the group consisting of T1/E1, FT1/FE1, ISDN, xDSL and FRNx56/64.

8. The system of claim 5, wherein a plurality of users communicate through said modems, said plurality of users are located in a contained community.

9. The system of claim 8, wherein said contained community includes at least one building.

10. The system of claim 9, wherein said dry copper connections are telephone wires terminated within said at least one building, such that each of said plurality of first modems is connected to one of said telephone wires through a telephone wire socket.

11. A system for providing a direct modem to modem connection, the system comprising:

(a) a first PC modem;

(b) a server side modem, wherein said first PC modem and said server side modem follow the V.90 specification;

(c) a dry copper connection for directly connecting said first PC modem and said server side modem; and (d) an Analog Front End (AFE), said AFE being connected between said server side modem and said dry copper connection, said AFE providing a digital to analog conversion, such that said first PC modem and said server side modem are able to communicate at a substantially maximum rate.

12. The system of claim 11, wherein said digital to analog conversion enables said first modem and said server side modem to communicate as though said dry copper connection was a regular digital telephony network.

13. The system of claim 11, wherein said AFE features:

(i) a CODEC (enCOder/DECoder) for analog to digital and digital to analog conversion.

14. The system of claim 13, wherein said AFE further features:

(ii) a frame creator for providing frame synchronization and clock synchronization.

15. The system of claim 11, wherein said first PC modem includes a plurality of first PC modems, said server side modem further includes a plurality of server side modems, said AFE further includes a plurality of Analog Front Ends (AFE's), each of said plurality of AFE's being connected to one of said plurality of server side modems, and said dry copper connection further includes a plurality of dry copper connections, each of said plurality of dry copper connections being connected to one of said plurality of first PC modems and to one of said plurality of AFE's, such that each of said plurality of first PC modems is able to communicate with one of said plurality of server side modems at a substantially maximum rate, such that a plurality of users communicate through said modems, the system further comprising:

(e) a central line for providing a shared connection to each of said plurality of server side modems.

16. The system of claim 15, wherein said central line is a high speed digital connection.

17. The system of claim 16, wherein said central line is selected from the group consisting of T1/E1, FT1/FE1, ISDN, xDSL and FRNx56/64.

18. The system of claim 15, wherein said plurality of users are located in a contained community.

19. The system of claim 18, wherein said contained community includes at least one building.

20. The system of claim 19, wherein said dry copper connections are telephone wires terminated within said at least one building, such that each of said plurality of first modems is connected to one of said telephone wires through a telephone wire socket.

21. An enhanced server modem for direct connection to a user PC modem through a dry copper connection, the user PC modem following the V. 90 specification, the enhanced server modem comprising:

(a) a server side modem following the V.90 specification; and (b) an Analog Front End (AFE) for providing a digital to analog conversion, said AFE including:

(i) a CODEC (enCOder/DECoder) for analog to digital and digital to analog conversion; and (ii) a frame creator for providing frame synchronization and clock synchronization, such that said frame creator and said CODEC are able to provide said digital to analog conversion;

said server side modem being connected to the dry copper connection through said AFE, such that said server side modem is able to communicate at a substantially maximum rate with the user PC modem.

* * * * *